United States Patent
Molnar et al.

(10) Patent No.: US 10,452,566 B2
(45) Date of Patent: Oct. 22, 2019

(54) STORING SECURE STATE INFORMATION IN TRANSLATION LOOKASIDE BUFFER CACHE LINES

(71) Applicant: NVIDIA CORPORATION, Santa Clara, CA (US)

(72) Inventors: Steven E. Molnar, Chapel Hill, NC (US); James Leroy Deming, Madison, AL (US); Michael A. Woodmansee, Lighthouse Point, FL (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/874,244

(22) Filed: Oct. 2, 2015

(65) Prior Publication Data
US 2017/0097896 A1    Apr. 6, 2017

(51) Int. Cl.
G06F 12/00 (2006.01)
G06F 12/14 (2006.01)

(52) U.S. Cl.
CPC ................... G06F 12/145 (2013.01)

(58) Field of Classification Search
CPC .... G06F 12/1009; G06F 12/109; G06F 12/06; G06F 2212/502; G06F 2212/657
See application file for complete search history.

(56) References Cited

U.S. PATENT DOCUMENTS

| | | | | |
|---|---|---|---|---|
| 6,370,632 B1* | 4/2002 | Kikuta | ............... | G06F 12/0837 711/205 |
| 7,461,232 B2* | 12/2008 | Nicolai | ............... | G06F 12/1036 711/163 |
| 7,716,673 B2* | 5/2010 | Chauvel | ............... | G06F 9/30174 711/202 |
| 2006/0095793 A1* | 5/2006 | Hall | ............... | G06F 12/145 713/190 |
| 2014/0189261 A1* | 7/2014 | Hildesheim | ............... | G06F 12/1027 711/152 |

* cited by examiner

*Primary Examiner* — John A Lane
(74) *Attorney, Agent, or Firm* — Artegis Law Group, LLP (57) ABSTRACT

One embodiment of the present invention includes a memory management unit (MMU) that is configured to efficiently process requests to access memory that includes protected regions. Upon receiving an initial request via a virtual address (VA), the MMU translates the VA to a physical address (PA) based on page table entries (PTEs) and gates the response based on page-specific secure state information. To thwart software-based attempts to illicitly access the protected regions, the secure state information is not stored in page tables. However, to expedite subsequent requests, after the MMU identifies the PTE and the corresponding secure state information, the MMU stores both the PTE and the secure state information as a cache line in a translation lookaside buffer. Advantageously, the disclosed embodiments protect data in the protected regions from security risks associated with software-based protection schemes without incurring the performance degradation associated with hardware-based "carve-out" memory protection schemes.

24 Claims, 5 Drawing Sheets

STORING SECURE STATE INFORMATION IN TRANSLATION LOOKASIDE BUFFER CACHE LINES

BACKGROUND OF THE INVENTION

Field of the Invention

Embodiments of the present invention relate generally to computer processing and, more specifically, to storing secure state information in translation lookaside buffer cache lines.

Description of the Related Art

Many computer systems include a central processing unit (CPU) and one or more parallel processing units (PPUs). The CPU usually executes the overall structure of a software application and then configures the PPUs to implement tasks that are amenable to parallel processing. As part of executing the software application, the CPU and/or the PPU access memory units included in the computer system. For example, while executing a video player application, the PPU could access high definition video that is stored in memory included in the computer system.

To protect high-value assets, such as the aforementioned high definition videos, providers of the assets oftentimes require computer systems to provide security functionality that restricts access to the assets. One technique that some computer systems implement to protect high-value assets involves storing access control information in page tables. However, because the operating system controls the page tables and the operating system is susceptible to security breaches, such a protection scheme is not necessarily secure. Another technique that other computer systems implement to protect high-value assets utilizes a trusted software layer outside of the operating system. However, because the trusted software requires knowledge of the application and trusted software is typically provided by a system vendor, not an application vendor, such a solution is difficult to coordinate. As these techniques illustrate, software-based protection schemes do not provide sufficient protection for high-value assets.

In an effort to overcome the limitations of software-based protection schemes, some computer systems provide hardware-based protection schemes. One type of hardware-based protection scheme involves "carving out" contiguous blocks of secure memory when the computer is initially booted up. In such a scheme, a certain number of contiguous memory blocks are allocated and reserved for use by secure applications. Upon receiving a memory access request via a virtual memory address, hardware-based units translate the virtual memory address to a physical address and then compare the physical memory address to the range of addresses included in the contiguous blocks of secure memory. Based on the results of the comparison, the hardware-based units either allow or reject the memory access request.

Although such a carve-out based protection scheme may satisfy vendor requirements for securing high-value assets, reserving contiguous blocks of memory for secure operations often reduces efficiencies inherent in virtual memory architectures that facilitate dynamic memory allocation. In particular, if executing applications require fewer secure memory blocks than the number of contiguous blocks reserved for secure operations, then valuable memory resources are squandered. By contrast, if executing applications require more secure memory blocks than the number of contiguous blocks reserved for secure operations, then the computer system must increase the number of contiguous blocks of secure memory during operation. Increasing the number of contiguous blocks involves, among other things, relocating existing data, which can reduce the speed at which the computer system executes applications.

As the foregoing illustrates, what is needed in the art is a more effective approach to protecting secure content.

SUMMARY OF THE INVENTION

One embodiment of the present invention sets forth a system configured to manage access requests to protected regions of memory. The system includes a memory that includes a page table having multiple page table entries; and a memory management unit coupled to the memory and configured to: receive a first request to translate a first virtual memory addresses to a first physical memory address; select a first page table entry included in the page table entries based on the first virtual memory address; translate the first virtual memory address to the first physical memory address based on the first page table entry; determine first secure state information based on the first physical memory address; store the first page table entry and the first secure state information in a first data cache line included in a first translation lookaside buffer associated with a first client; and generate a first memory access response based on the first page table entry and the first secure state information Further embodiments provide, among other things, a computer-implemented method and a non-transitory computer-readable medium configured to implement the system set forth above.

One advantage of the disclosed system is that it enables effective and flexible protection of high-value assets. In particular, by implementing security functionality in hardware, the system may satisfy vendor requirements for securing high-value assets that systems relying on software-based protection schemes are unable to satisfy. Further, because the secure state information is dynamic (i.e., may be changed after boot time), the disclosed system does not exhibit the performance degradation typically associated with hardware-based "carve-out" memory protection schemes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
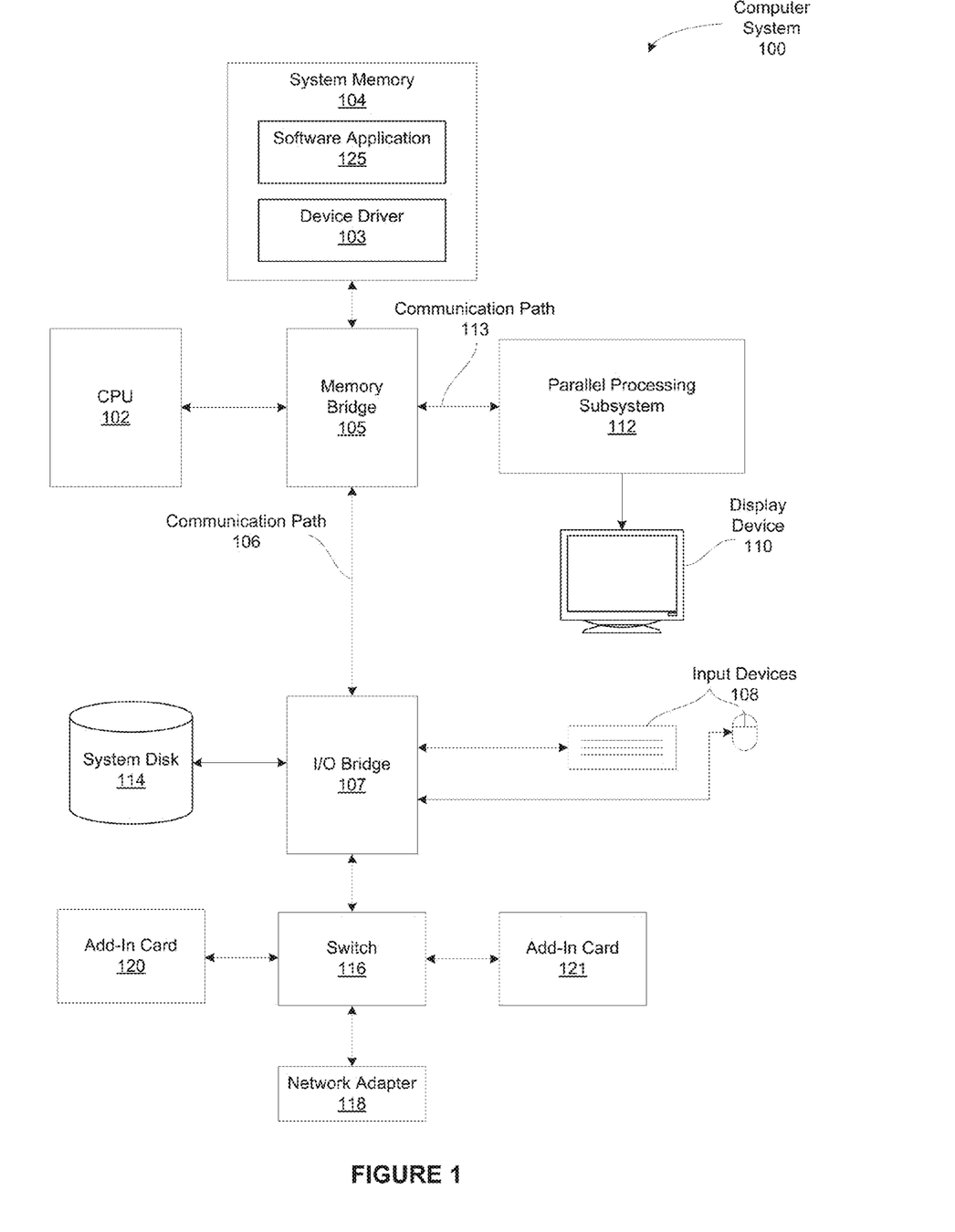
FIG. 1 illustrates a computer system configured to implement one or more aspects of the present invention.

FIG. 1 illustrates a computer system 100 configured to implement one or more aspects of the present invention. As shown, the computer system 100 includes, without limitation, a central processing unit (CPU) 102 and a system memory 104 coupled to a parallel processing subsystem 112 via a memory bridge 105 and a communication path 113. The memory bridge 105 is further coupled to an I/O (input/output) bridge 107 via a communication path 106, and I/O bridge 107 is, in turn, coupled to a switch 116.

In operation, the I/O bridge 107 is configured to receive user input information from input devices 108, such as a keyboard or a mouse, and forward the input information to the CPU 102 for processing via the communication path 106 and the memory bridge 105. The switch 116 is configured to provide connections between the I/O bridge 107 and other components of the computer system 100, such as a network adapter 118 and various add-in cards 120 and 121.

As also shown, the I/O bridge 107 is coupled to a system disk 114 that may be configured to store content and applications and data for use by the CPU 102 and the parallel processing subsystem 112. As a general matter, the system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 107 as well.

In various embodiments, the memory bridge 105 may be a Northbridge chip, and the I/O bridge 107 may be a Southbridge chip. In addition, the communication paths 106 and 113, as well as other communication paths within the computer system 100, may be implemented using any technically suitable protocols, including, without limitation, AGP (Accelerated Graphics Port), HyperTransport, or any other bus or point-to-point communication protocol known in the art.

In some embodiments, the parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within the parallel processing subsystem 112. In other embodiments, the parallel processing subsystem 112 incorporates circuitry optimized for general purpose and/or compute processing. Again, such circuitry may be incorporated across one or more PPUs included within the parallel processing subsystem 112 that are configured to perform such general purpose and/or compute operations. In yet other embodiments, the one or more PPUs included within the parallel processing subsystem 112 may be configured to perform graphics processing, general purpose processing, and compute processing operations. The system memory 104 includes at least one device driver 103 configured to manage the processing operations of the one or more PPUs within parallel processing subsystem 112. The system memory 104 also includes any number of software applications 125 that execute on the CPU 102 and may issue commands that control the operation of the PPUs.

In various embodiments, the parallel processing subsystem 112 may be integrated with one or more other the other elements of FIG. 1 to form a single system. For example, the parallel processing subsystem 112 may be integrated with the CPU 102 and other connection circuitry on a single chip to form a system on chip (SoC).

It will be appreciated that the system shown herein is illustrative and that variations and modifications are possible. The connection topology, including the number and arrangement of bridges, the number of the CPUs 102, and the number of the parallel processing subsystems 112, may be modified as desired. For example, in some embodiments, the system memory 104 could be connected to the CPU 102 directly rather than through the memory bridge 105, and other devices would communicate with the system memory 104 via the memory bridge 105 and the CPU 102. In other alternative topologies, the parallel processing subsystem 112 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. Lastly, in certain embodiments, one or more components shown in FIG. 1 may not be present. For example, the switch 116 could be eliminated, and the network adapter 118 and the add-in cards 120, 121 would connect directly to the I/O bridge 107.

Figure 2:
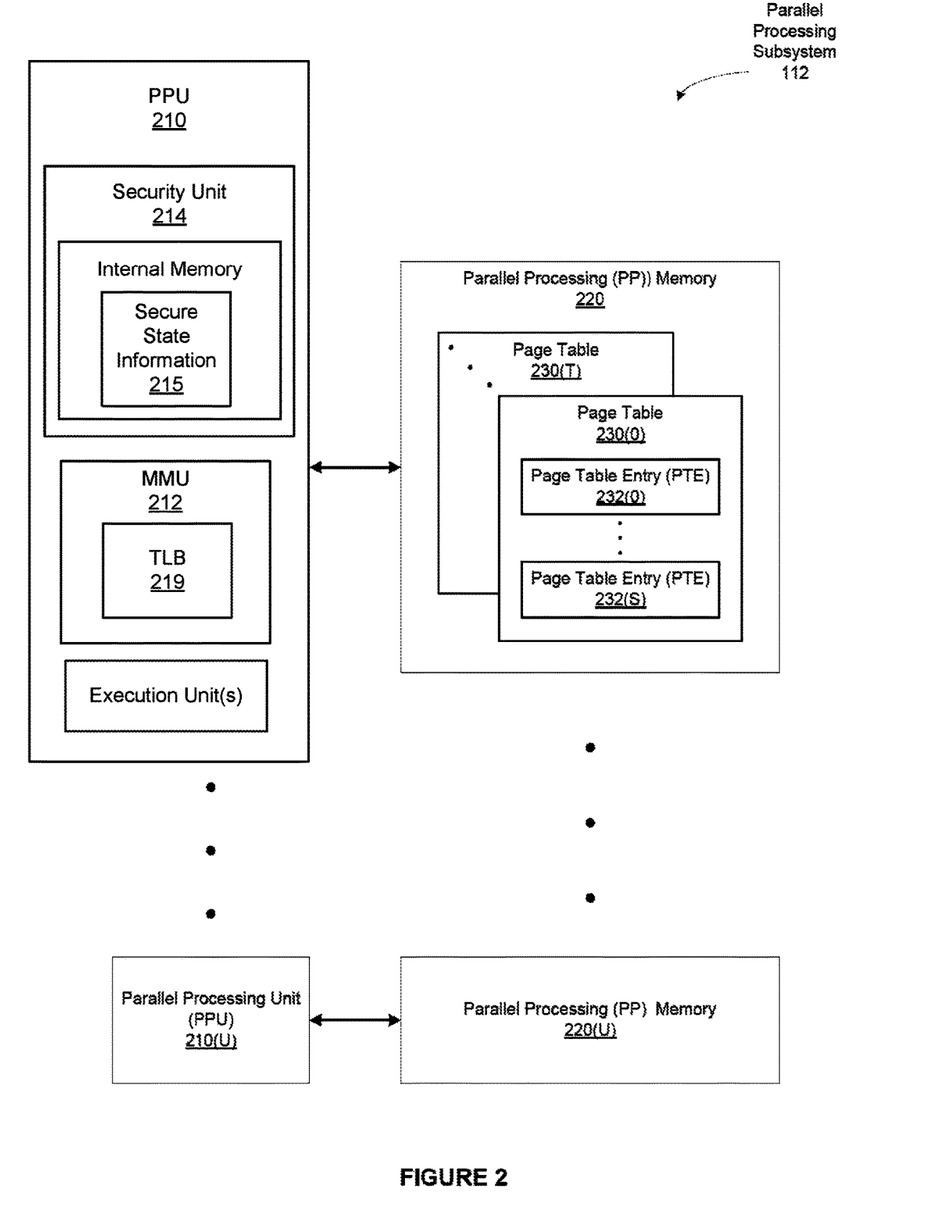
FIG. 2 is a more detailed illustration of the parallel processing subsystem of FIG. 1, according to one embodiment of the present invention.

FIG. 2 is a more detailed illustration of the parallel processing subsystem 112 of FIG. 1, according to one embodiment of the present invention. As shown, the parallel processing subsystem 112 includes one or more parallel processing units (PPUs) 210, each of which is coupled to a parallel processing (PPU) memory 220 (i.e., a local memory). In general, a parallel processing subsystem includes a number U of PPUs, where U≥1. (Herein, multiple instances of like objects are denoted with reference numbers identifying the object and parenthetical numbers identifying the instance where needed.) The PPUs 210 and the PP memories 220 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of the PPUs 210 in the parallel processing subsystem 112 are graphics processors with rendering pipelines that can be configured to perform various operations related to generating pixel data from graphics data supplied by the CPU 102 and/or the system memory 104 via the memory bridge 105 and the communication path 113, interacting with the PP memory 220 (which can be used as graphics memory including, e.g., a conventional frame buffer) to store and update pixel data, delivering pixel data to display device 110, and the like. In alternate embodiments, the parallel processing subsystem 112 may not include the PP memory 220 and the parallel processing subsystem 112 may interact with any type of memory (e.g., the system memory 104) to store and update pixel data, delivering pixel data to the display device 110, and the like.

In some embodiments, parallel processing subsystem 112 may include one or more of the PPUs 210 that operate as graphics processors and one or more of the other PPUs 210 that are used for general-purpose computations. The PPUs 210 may be identical or different, and each of the PPUs 210 may have a dedicated parallel processing memory device(s) or no dedicated parallel processing memory device(s). One or more of the PPUs 210 in the parallel processing subsystem 112 may output data to the display device 110 or each of the PPUs 220 in the parallel processing subsystem 112 may output data to one or more of the display devices 110.

Referring back now to FIG. 2 as well as FIG. 1, each of the PPUs 210 communicates with the rest of the computer system 100 via the communication path 113, which connects to the memory bridge 105 (or, in one alternative embodiment, directly to the CPU 102). The connection of the PPU 210 to the rest of the computer system 100 may also be varied. In some embodiments, the parallel processing subsystem 112 is implemented as an add-in card that can be inserted into an expansion slot of the computer system 100. In other embodiments, the PPU 210 can be integrated on a single chip with a bus bridge, such as the memory bridge 105 or the I/O bridge 107. In still other embodiments, some or all elements of the PPU 210 may be integrated on a single chip with the CPU 102. In one embodiment, the communication path 113 is a PCI Express link, in which dedicated lanes are allocated to each of the PPUs 210, as is known in the art. Other communication paths may also be used.

Each of the PPUs 210 advantageously implements a highly parallel processing architecture. For example, in some embodiments, the PPU 210 includes a plurality of execution units, such as general processing clusters (GPCs) and/or streaming multiprocessors (SMs), which are configured to execute multiple threads (i.e., an instance of a program). And each of the PPUs 210 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. The PPUs 210 may transfer data from the system memory 104 and/or the PP memories 220 into internal (on-chip) memory, process the data, and write result data back to the system memory 104 and/or the PP memories 220, where such data can be accessed by other system components, including the CPU 102 or another parallel processing subsystem 112.

The PPU 210 may be provided with any amount of PP memory 220, including no parallel processing memory (i.e., no local memory), and may use the PP memory 220 and the system memory 104 in any combination and in any technically feasible fashion. For example, the computer system 100 could implement a unified virtual memory (UVM) architecture common to both the CPU 102 and the PPUs 210. Among other things, the UVM architecture could enable the CPU 102 and the PPUs 210 to access a physical memory location using a common virtual memory address, regardless of whether the physical memory location is within the system memory 104 or the PP memory 220.

In operation threads in the PPU 210 may request data stored in memory (e.g., the PP memory 220) via a virtual memory address. Virtual memory addresses shield threads executing in the PPU 210 from knowledge about the internal workings of a memory system. Thus, a thread may only have knowledge of virtual memory addresses, and may access data by requesting data via a virtual memory address.

To enable threads to efficiently access data via virtual memory addresses, the PPU 210 includes, without limitation, a memory management unit (MMU) 212, a security unit 214. The memory management unit (MMU) 212 processes requests from the PPU 210 and other memory clients for translating virtual memory addresses to physical memory addresses. The physical memory addresses are required to access data stored in a physical memory unit such as the PP memory 220. To optimize accesses to the PP memory 220, the MMU 212 includes, without limitation, one or more translation look-aside buffers (TLBs) 219 that implement a single or multiple-level cache hierarchy that stores translation information for virtual memory addresses associated with recent requests.

The security unit 214 is configured to provide the security state for physical memory addresses, enabling the MMU 212 to appropriately process requests to access confidential data. As shown, the security unit 214 includes secure state information 215. The secure state information 215 may include any type and granularity of data relevant to determining the validity of accesses to the PP memory 220. For example, the security state information 215 could include any number of secure state bits that specify the authorized clients and/or the valid access methods (e.g., read access, write access, etc.) for each physical page of the PP memory 220. In such a scenario, the security state information 215 could enable the MMU 212 to perform page-based content protection, micro-code protection, and the like.

Because the PP memory 220 may be unacceptably vulnerable to security risks, such as attacks by malicious software, the secure unit 214 typically determines the secure state information 215 without relying on the PP memory 220. For example, in some embodiments, the secure unit 214 may retrieve the secure state information 215 from an on-chip table included in the PPU 210. In alternate embodiments, the secure unit 214 may retrieve the secure state information 215 from off-chip storage and then cache the secure state information 215 on-chip. In alternate embodiments, the secure unit 214 may be configured to provide the secure state information 215 in any technically feasible and tamper-resistant fashion.

The PP memory 220 includes, without limitation, any number of page tables 230. Each of the page tables 230 includes one or more page table entries (PTE) 232 that provide mappings between virtual memory addresses and physical memory addresses. More specifically, the PTE 232 associated with a virtual memory address includes a physical page number and one or more translation bits. The physical page number indicates either the next page in the page table translation hierarchy or a physical page of memory. The process of traversing the page table hierarchy to determine a physical memory address that corresponds to the virtual memory address is referred to as a "page walk." The translation bits may include any number and type of information relevant to the translation process. For instance, in some embodiments, the translation bits may include, without limitation, a size bit, a read permission bit, a write permission bit, an execution permission bit, an atomic access bit, an accessed bit, a dirty bit, and the like.

Note that the techniques described herein are illustrative rather than restrictive, and may be altered without departing from the broader spirit and scope of the invention. In particular, the techniques outlined herein are applicable to any MMU implemented in any processing unit, including the CPU 120. Further, in some embodiments, instead of or in addition to the MMU 212, one or more execution units included in the PPU 210 includes an MMU. In general, the number and arrangement of elements in the page table translation hierarchy and PTE 232 can be varied. Further, in some embodiments, one or more of the page tables 230 may be stored in the system memory 104.

In addition, the PP memory 220 and the memory system disclosed in FIGS. 1 and 2 are simply one example of systems within which the inventive concepts disclosed herein can be implemented. Persons skilled in the art will understand that the inventive concepts can be implemented in conjunction with any other appropriate memory system. In general, in alternate embodiments, the security unit may be configured to protect data stored in any type of memory instead of, or in addition to, the PP memory. For example, and without limitation, in some embodiments, the security unit may be configured to protect data stored in system memory and the secure state information may include any type and granularity of data relevant to determining the validity of accesses to system memory. In still other embodiments, the security unit may be configured to protect data stored in any type of local memory or off-chip memory or any combination of those memory types. Further, the security unit may be configured to protect any type of data. For example, in some embodiments the security unit may protect micro-code. The architecture and descriptions associated with FIGS. 1 and 2 are in no way intended to limit the scope of the present invention or the implementation of the inventive concepts disclosed herein.

Processing Memory Access Requests

Figure 3:
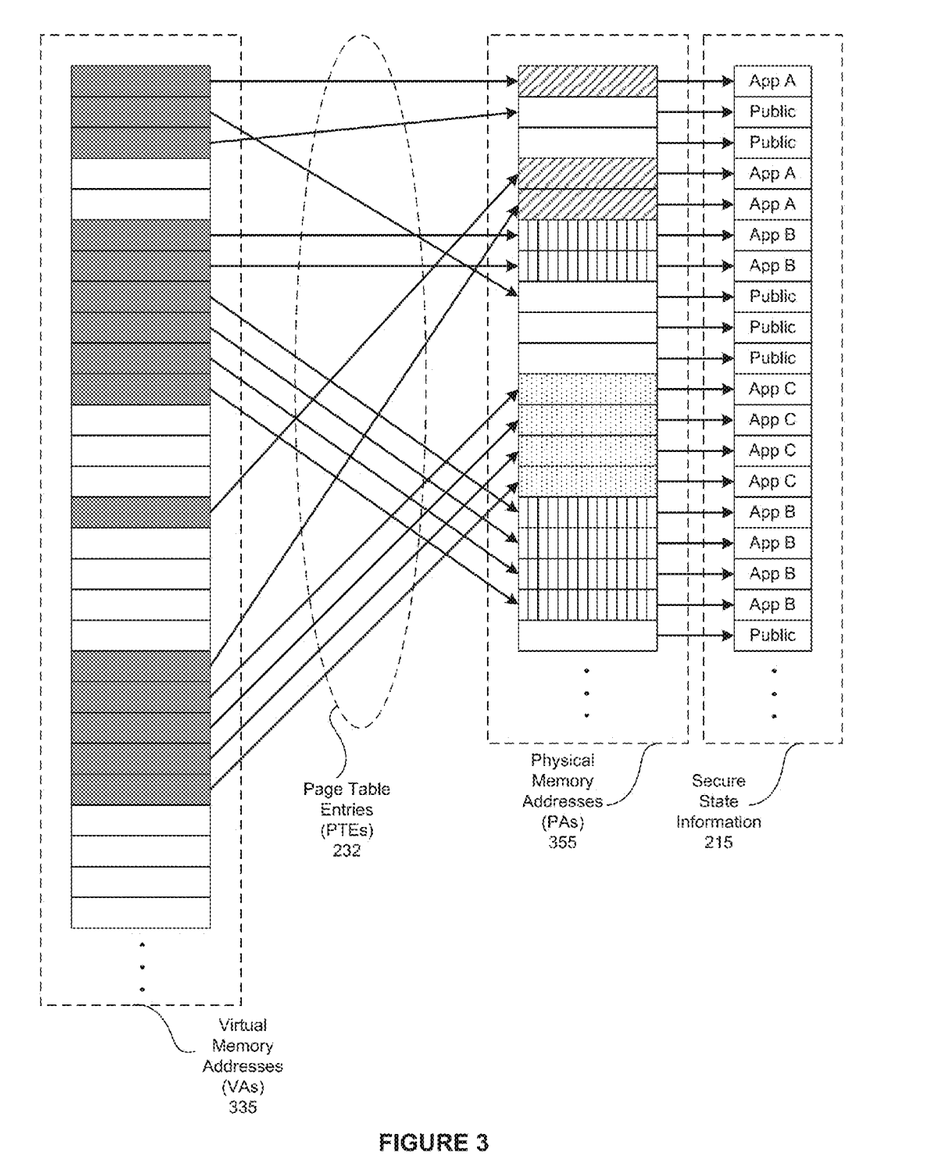
FIG. 3 illustrates how virtual memory addresses (VAs) may be mapped to physical memory addresses (PAs) and secure state information, according to one embodiment of the present invention.

FIG. 3 illustrates how virtual memory addresses (VAs) 335 may be mapped to physical memory addresses (PAs) 355 and secure state information 215, according to one embodiment of the present invention. For explanatory purposes, the virtual memory addresses (VA) 335 that do not access memory pages that are resident in the PP memory 220 are represented as unfilled boxes. Similarly, the PAs 355 that correspond to unallocated (i.e., "free") memory pages in the PP memory 220 are represented as unfilled boxes. Finally, the secure state information 215 defaults to "public"— enabling all clients (i.e., requesting units of the MMU 212) similar security-based access to the corresponding memory pages.

As shown, the VAs 335 that access data that is resident in the PP memory 220 are represented as filled boxes. Further, the mappings between the VAs 335 that access data that is resident in the PP memory 204 and the PAs 355 that specify the locations of the corresponding data in the PP memory 220 are represented with arrows. As shown, the page table entries (PTEs) 232 provide mappings between the VAs 335 that access data that is resident in the PP memory 220 and the PAs 355.

Each of the PAs 335 is associated both with a memory page included in the PP memory 220 and with page-specific secure state information 215. The secure state information 215 may be assigned and maintained in any technically feasible fashion that is consistent with enabling per-page dynamic (i.e., after boot time) content protection. As shown, the secure state information 215 includes four separate protection states: "application (app) A," "application (app) B," "application (app) C," and "public." Further, both the protection states "application A" and "application B" are associated with discontinuous memory pages. More specifically, memory pages that are associated with the "application A" protection state are separated by memory pages that are associated with the "public" protection state. Memory pages associated with the "application B" protection state are separated by memory pages associated with the "public" and "application C" protection states.

In alternate embodiments, the secure state information 215 may include any number of protection states and each protection state may be shared between multiple clients and/or applications. For example, in some alternate embodiments, the secure state information 215 may provide protection states denoting protected data for each of several applications or virtual machines. In other alternate embodiments, the secure state information 215 may provide only two protected states: "protected" and "public."

As illustrated in FIG. 3, because the MMU 212 and the secure state information 215 enable the PPU 210 to fine-tune the "protected" regions of the PP memory 205, the memory usage and/or performance of the PPU 210 may be optimized while executing the software applications 125. By contrast, creating a carve-out region of a relatively large number of continuous blocks of protected memory at boot time may unnecessarily increase the amount of the PP memory 205 used to execute software applications 125. Further, creating a carve-out region of a relatively small number of contiguous blocks of protected memory at boot time may subsequently require performing time-consuming memory operations that reduce the speed at which the PPU 210 can execute the software applications 125. More specifically, to allow executing software applications 125 to operate on large amounts of confidential data, such MMUs may relocate existing "public" data within the PP memory 220 as part of increasing the number of contiguous blocks of protected memory.

In alternate embodiments, the alignment between the VAs 335 and the PAs 3355 may differ. More specifically, in some computer systems 100, the size of a "virtual" memory page does not match the size of a "physical" memory page. Further, in some embodiments, the secure state information 215 may include any type and granularity of data and the MMU 212 may implement protection at any level that is consistent with the secure state information 215. For example, in some embodiments the secure state information 215 may include secure state information 215 per-block instead of per-page, and the MMU 212 may implement per-block protection. As referred to herein, a block is a range of memory that might larger or smaller than a physical memory page or a virtual memory page.

Figure 4:
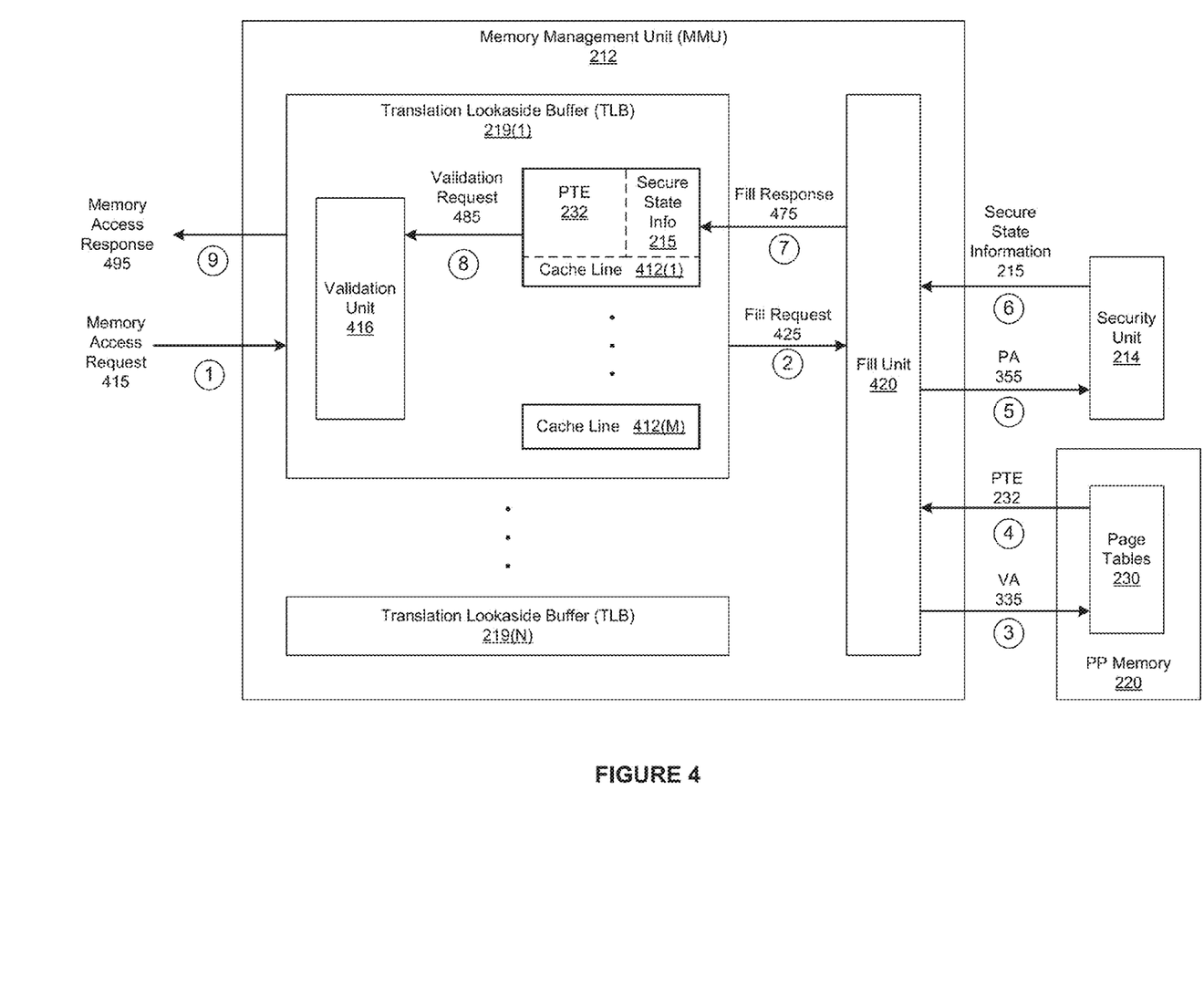
FIG. 4 illustrates how the translation lookaside buffer (TLB) of FIG. 2 may process a memory access request, according to one embodiment of the present invention.

FIG. 4 illustrates how the translation lookaside buffer (TLB) 219 of FIG. 2 may process a memory access request 415, according to one embodiment of the present invention. For explanatory purposes, a sequence of nine communication events that may be precipitated by the memory access request 415 is depicted with numbered bubbles. More specifically, in the sequence depicted, the communication labeled with the "1" bubble occurs before the communication labelled with the "2" bubble, and so forth.

As shown, the MMU 212 includes, without limitation, any number of the TLBs 219 and a fill unit 420. Although not shown in FIG. 4, the MMU 212 may process any number of memory access requests 415 in parallel. Further, each of the memory access requests 415 may be received from a different client and each of the TLBs 219 may be configured to process the memory access requests 415 received from a different client. For example, the TLB 219(0) could be configured to process the memory access requests 415 received from an SM executing a thread as part of a high-definition video application and the TLB 219(2) could be configured to process the memory access requests 415 from an SM executing microcode.

Each of the TLBs 219 includes one or more cache lines 412 and a validation unit 416. The MMU 212 implement a single or multi-level cache hierarchy that enables the TLB 219 to reuse translation information for VAs 335 associated with the memory access requests 415 that the TLB 219 has recently received. In operation, upon receiving the memory access request 415 via the VA 335 (labelled with the "1" bubble), the TLB 219 performs a lookup operation to determine if the cache lines 412 include a cached mapping associated with the VA 335. As used herein, a "cached mapping" for the VA 335 refers to an aggregation of the PTE 232 and the secure state information 215 that the TLB 219 has previously stored in one of the cache lines 412. Notably, each of the cache lines 412 may include cached mappings for any number of the VAs 335 organized and accessed in any technically feasible fashion. For example, in some embodiments, each of the cache lines 412 may implement a compressed representation for multiple PTEs 232 and the associated secure state information 215.

If the TLB 219 finds a cached mapping associated with the VA 335, then the TLB 219 uses the cached mapping to expedite the memory access request 415. More specifically, the TLB 219 omits the communications associated with generating the cached mapping (labelled with the "2" through "7" bubbles). Instead, after retrieving the cached mapping, the TLB sends a validation request 485 (labelled with the "8" bubble) that includes the translated address and the secure state information 215 included in the cached mapping to the validation unit 416.

Upon receiving the validation request 485, the validation unit 416 performs one or more operations on the secure state information 215 to ascertain whether the memory access request 415 is an authorized request. In particular, based on the secure state information 215, the validation unit 416 determines whether the client of the TLB 219 that issued the memory access request 415 and/or the application is authorized to access the data stored at the location in the PP memory 220 that is specified by the PA 355. The validation unit 416 may determine the validity of the memory access request 415 in any technically feasible fashion. For example, in some embodiments the memory access request 414 may include information that identifies any combination of, without limitation, the client of the TLB 219 that issued the memory access request 414, the application, a context, or a virtual machine. In such embodiments, the validation unit 416 may perform comparison operations between this identifying information and the secure state information 215 to determine whether the memory access request 415 is an authorized request.

In general, the validation unit 416 may implement any technically feasible technique to determine whether the memory access request 415 is an authorized request based on any type of information, such as information included in the memory access request 414. For example, the validation unit 416 may implement "per client" protection, "client group" protection, "region ID" protection, and so forth. In some alternate embodiments, each client is associated with a trust level (e.g., "untrusted, "trusted," etc.) In such embodiments, the validation unit 416 may determine whether the memory access request 415 is an authorized request based on the secure state information 215 and the trust level of the client.

If the validation unit 416 determines that the memory access request 415 is authorized, then the TLB 219 continues to process the memory access request 415 in the conventional manner. More specifically, the TLB 219 translates the VA 335 to the PA 355 based on the PTE 232 that is associated with the VA 335. The TLB 219 provides the associated PA 355 along with an acknowledgement of the memory access request 415 as a memory access response 495 (labelled with the "9" bubble).

If the validation unit 416 determines that the memory access request 415 is not authorized, then the TLB 219 does not provide the PA 355 to the client. Instead, the TLB 219 generates a fault as the memory access response 495 (labelled with the "9" bubble), thereby indicating to the client that the memory access request 415 was unsuccessful. In this fashion, the TLB 219 thwarts attempts to compromise the security of confidential data on a page-based, client-specific basis. In alternate embodiments, the secure state information 215 and the validation unit 416 may be configured in a coordinated fashion to determine the validity of the memory access request 415 based on any number of additional factors, such as type of request (e.g., read, write, etc.) and the like. Further, in alternate embodiments, if the validation unit 416 determines that the memory access request 415 is invalid, then the validation unit 416 may implement any type of invalidation handling. For example, in some embodiments, if the MMU 212 indicates that the memory access request 415 is invalid, then the logic implemented in a unit external to the MMU 212 aborts the memory access request 415 in any technically feasible fashion (e.g., suppresses a write, overwrites read data with all zeros or all ones, and so forth). In various embodiments, the MMU 212 may or may not indicate a fault.

Although expediting processing of the memory access request 415 based on the cached mapping is desirable, due to memory size limitations, including cached mappings for all the VAs 335 that are mapped to PAs 355 is not usually feasible. Consequently, upon receiving the memory access request 415, the TLB 219 may be unable to find a cached mapping associated with the VA 335, a scenario referred to as a page miss. If the TLB 219 is unable to find a cached mapping associated with the VA 335, then the TLB 219 sends a fill request 425 (labelled with the "2" bubble) for the VA 335 to the fill unit 420.

Upon receiving the fill request 425 for the VA 335, the fill unit 420 executes a page walk that searches the page tables 230 for the mapping information (i.e., the PTE 232) that is associated with the VA 335 (labelled with the "3" bubble). The fill unit 420 may implement the page walk in any technically feasible fashion. For example, the fill unit 420 could call a page table walker that traverses the page tables 230 until locating the PTE 232 that is associated with the VA 335. Further, in some embodiments, the fill unit 420 may search any number of higher level page table caches for the information needed to walk the page tables. If the fill unit 420 determines that the information needed to walk the page tables is not included in any higher level TLBs, then the fill unit 420 may start the page table walk at the level that has the necessary information.

After retrieving the PTE 232 that is associated with the VA 335 (labelled with the "4" bubble), the fill unit 420 translates the VA 335 to the PA 355 based on the PTE 232. The fill unit 420 then transmits the PA 335 to the security unit 214 (labelled with the "5" bubble). The security unit 214 determines the secure state information 215 that is associated with the PA 355 and, therefore the VA 335, and transmits the secure state information 215 that is associated with the PA 355 to the fill unit 420 (labelled with the "6" bubble).

The security unit 214 may determine the secure state information 215 in any technically feasible fashion that is consistent with minimizing security risks that could compromise confidential data included in the PP memory 220. For example, the security unit 214 may store the secure state information 215 for any number of PAs 355 in an on-chip table that is not accessible via any of the software applications 125, including any operating systems. The secure state information 215 could include any type of data formatted in any technically feasible fashion. For example, the secure state information 215 for the PA 335 may include any number of security bits that can be used to identify the clients that are authorized to access the data that is stored at the location in the PU memory 220 that is specified by the PA 335.

The fill unit 420 aggregates the PTE 232 and the secure state information 215 that are associated with the VA 335 as a fill response 475 (labelled with the "7" bubble). More specifically, the fill unit 420 creates the fill response 475 such that the fill response 475 configures the TLB 219 to load the PTE 232 and the secure state information 215 into the appropriate cache line 412, thereby creating a cached mapping that is associated with the VA 335. The TLB 219 then uses the cached mapping that is associated with the VA 335 to process the memory access request 415 as described above with reference to the communications events labelled with the "8" and "9" bubbles.

The MMU 212, the TLB 219, the cache lines 412, the validation unit 416, the fill unit 420, and the security unit 214 may be implemented in any technically feasible fashion. Notably, to optimize the security of the confidential data stored in the PP memory 220, the MMU 212, the TLB 219, the cache lines 412, and the validation unit 416 are typically implemented in hardware. Further, each of the MMU 212, the TLB 219, and the cache lines 412 may include any additional functionality as known in the art. For example, the MMU 212 may be configured to perform conventional error processing, including issuing a page fault when receiving a particular memory access request 415 via a particular VA 335 that does not access a memory page that is resident in the PP memory 220.

Figure 5:
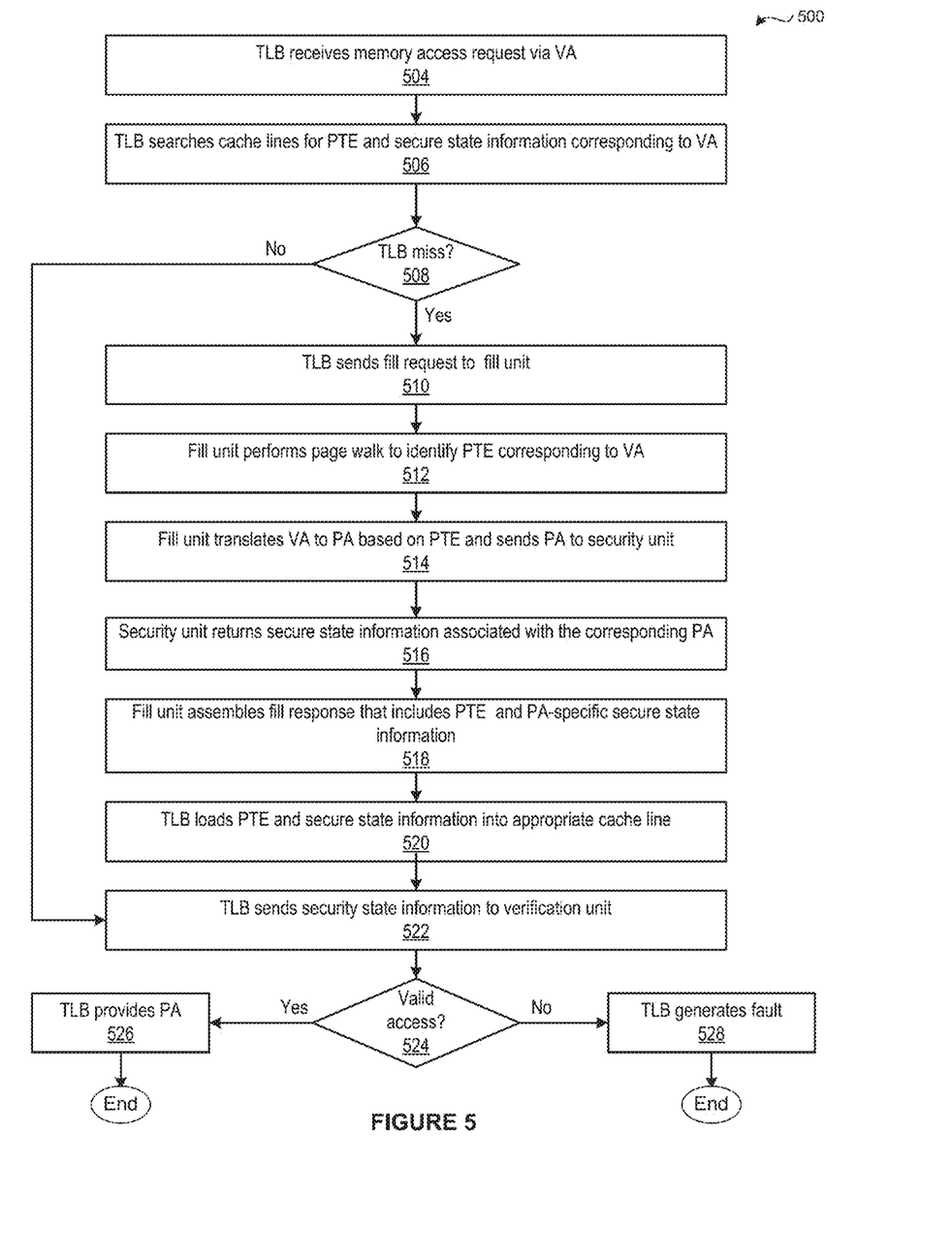
FIG. 5 is a flow diagram of method steps for processing requests to access protected regions of memory, according to one embodiment of the present invention.

FIG. 5 is a flow diagram of method steps for processing requests to access protected regions of memory, according to one embodiment of the present invention. Although the method steps are described with reference to the systems of FIGS. 1-4, persons skilled in the art will understand that any system configured to implement the method steps, in any order, falls within the scope of the present invention.

As shown, a method 500 begins at step 504, where the TLB 219 receives the memory access request 415 via the virtual memory address (VA) 333. The memory access request 415 may be associated with a thread that is executing in any unit included in the PPU 210 (e.g., a streaming multiprocessor, etc.) that is a client of the TLB 219, a non-programmable engine (e.g., a video encoder or a video decoder), or any other client of the TLB 219. At step 506, the TLB 219 searches the cache lines 412 for the PTE 232 and the secure state information 215 associated with the VA 335.

At step 508, the TLB 219 determines whether a TLB miss has occurred (i.e., the cache lines 412 do not include information associated with the VA 335). At step 508, if the TLB 219 determines that a TLB miss has occurred, then the method 500 proceeds to step 510. At step 510, the TLB 219 sends a fill request 425 for the VA 335 to the fill unit 420.

At step 512, the fill unit 420 executes a page walk that searches the page tables 230 for the PTE 232 that is associated with the VA 335. The fill unit 420 may implement the page walk in any technically feasible fashion.

At step 514, the fill unit 420 translates the VA 335 to the PA 355 based on the PTE 232. The fill unit 420 then transmits the PA 335 to the security unit 214. The fill unit 420 may transmit the PA 335 to the security unit 214 in any technically feasible fashion, such as setting the values of one or more registers. At step 516, the security unit 214 determines the secure state information 215 based on the corresponding PA 355 and then transmits the secure state information 215 that is associated with the PA 355 to the fill unit 420. The security unit 214 may identify and transmit the secure state information 215 in any technically feasible fashion.

At step 518, the fill unit 420 assembles the fill response 475—including both the PTE 232 and the PA-specific secure state information 215. The fill unit 420 then transmits the fill response 475 to the TLB 219. At step 520, the TLB 219 receives the fill response 475. The fill response 475 configures the TLB 219 to load the PTE 232 and the secure state information 215 that are associated with the VA 335 into the appropriate cache line 412, thereby enabling the TLB to expedite subsequent memory access requests via the VA 335.

If, at step 508, the TLB 219 determines that a TLB miss has not occurred, then the method 500 proceeds directly to step 522. At step 522, the TLB 219 sends a validation request 485 that includes the secure state information 215 that is associated with the VA 335 to the validation unit 416. At step 524, the validation unit 416 determines whether the memory access request 415 is authorized based on the secure state information 215. If, at step 524, the validation unit 416 determines that the memory access request 415 is authorized, then the method 500 proceeds to step 526.

At step 526, the TLB 219 continues to process the memory access request 415 in the conventional manner. More specifically, the TLB 219 translates the VA 335 to the PA 355 based on the PTE 232 that is associated with the VA 335. Subsequently, the TLB 219 sets a physical address field included in the memory access request 415 to the PA 355 and then generates an acknowledgement of the memory access request 415. The method 500 then terminates.

At step 524, if the validation unit 416 determines that the memory access request 415 is not authorized, then the method 500 proceeds directly to step 528. At step 528, the TLB 219 generates a fault, thereby indicating to the client that the memory access request 415 was unsuccessful. Unsuccessful memory access requests are then "killed" in any technically feasible fashion that protects the confidentiality of the data stored at the location in the PP memory 220 that is specified by the PA 355. The method 500 then terminates.

In sum, the disclosed techniques enable a computer system to efficiently enforce page-based protection for confidential assets stored in memory. In operation, upon receiving a request to access memory via a virtual memory address (VA), a translation lookaside buffer (TLB) determines whether the TLB includes a cache line associated with the VA. If the TLB does not include a cache line that is associated with the VA, then the TLB transmits the VA to a fill unit. The fill unit performs a page table walk to identify the PTE associated with the VA. Based on the PTE, the fill unit translates the VA to a physical memory address (PA) and then transmits the PA to a security unit. The security unit determines the secure state information associated with the PA and returns the secure state information to the fill unit. The fill unit then generates a fill response that includes both the PTE and the secure state information. Upon receiving the fill response, the TLB stores the fill response in a cache line included in the TLB, thereby expediting subsequent requests to access memory via the VA.

After obtaining the PTE and the secure state information (either from a cache line or the fill unit), the TLB determines whether the request is authorized based on the secure data. If the request is authorized, then the TLB processes the request in the conventional fashion. More specifically, the TLB translates the VA to a PA based on the PTE, sets a physical memory address associated with the request to the PA, and generates an acknowledgement of the request. By contrast, if the request is not authorized (e.g. the secure state information indicates that the memory is in a secure region that is protected from the client of the TLB), then the TLB disrupts the request—protecting the secure asset stored at the memory location specified by the PA.

Advantageously, the disclosed techniques enable computer systems to efficiently and flexibly regulate access to confidential data stored in memory. Because the translation lookaside buffer (TLB) enforces security based on information that is not included in the page tables, the confidential data is not susceptible to exploitation of security limitations inherent in software and page tables. Further, because the secure state information is page-based, the overall time required to execute a software application is reduced. In particular, the disclosed techniques do not exhibit the same extent of memory and execution time degradation typically associated with conventional hardware-based approaches, where default numbers of memory blocks are designated and reserved at boot time.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of audiovisual equipment and sensors, persons skilled in the art will appreciate that the systems and techniques described herein are applicable to other types of performance output devices (e.g., lasers, fog machines, etc.) and sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

The invention claimed is:

1. A system configured to manage access requests to protected regions of memory, the system comprising:
   a system-on-chip that includes a plurality of processing units and a first memory, wherein:
      the first memory includes a page table having a plurality of page table entries; and
      a first parallel processing unit is included in the plurality of the processing units, wherein the first parallel processing unit includes an internal memory and a memory management unit, and wherein the memory management unit is coupled to the first memory and configured to:
         receive a first request to translate a first virtual memory address to a first physical memory address;
         select a first page table entry included in the plurality of page table entries based on the first virtual memory address;
         translate the first virtual memory address to the first physical memory address based on the first page table entry;
         determine first secure state information based on the first physical memory address;
         store the first page table entry and the first secure state information in a first data cache line included in a first translation lookaside buffer associated with a first client, wherein the first secure state information originates from the internal memory and specifies at least one client authorized to access the first physical memory address; and
         generate a first memory access response based on the first page table entry and the first secure state information.

2. The system of claim 1, wherein the first request is received from the first client, and generating the first memory access response comprises determining that the first client is authorized to access data stored at a location specified by the first physical memory address based on the first secure state information.

3. The system of claim 2, wherein generating the first memory access response further comprises transmitting a response to the first client, wherein the response includes the first physical memory address.

4. The system of claim 2, wherein the first secure state information indicates that the first physical memory address specifies a location that is not included in the protected regions of memory.

5. The system of claim 1, wherein the first request is received from the first client, and generating the first memory access response comprises determining that the first client is not authorized to access data stored at a location specified by the first physical memory address based on the first secure state information.

6. The system of claim 1, wherein generating the first memory access response comprises:
   determining whether the first request is authorized to access data stored at a location specified by the first physical memory address based on the first secure state information; and
   if the first request is authorized, then producing a response that indicates a success state; or
   if the first request is not authorized, then producing a response that indicates a failure state.

7. The system of claim 1, wherein the memory management unit is further configured to:
   receive a second request to translate a second virtual memory address to a second physical memory address;
   select, based on the second virtual memory address, a second data cache line included in the first translation lookaside buffer that includes a second page table entry and second secure state information; and
   generate a second memory access response based on the second page table entry and the second secure state information.

8. The system of claim 1, wherein the memory management unit is further configured to:
   receive a second request to translate a second virtual memory address to a second physical memory address, wherein the second request is received from a second client;
   select, based on the second virtual memory address, a second cache line included in a second translation lookaside buffer that is associated with the second client, wherein the second cache line includes a second page table entry and second secure state information; and
   generate a second memory access response based on the second page table entry and the second secure state information.

9. The system of claim 1, wherein the memory comprises a local memory.

10. The system of claim 1, wherein the memory comprises a system memory.

11. A method for managing access requests to protected regions of memory, the method comprising:
    receiving a first request to translate a first virtual memory address to a first physical memory address;
    selecting a first page table entry included in a page table having a plurality of page table entries based on the first virtual memory address, the page table being stored to a first memory coupled to a memory management unit of a first parallel processing unit;
    translating the first virtual memory address to the first physical memory address based on the first page table entry;
    determining first secure state information based on the first physical memory address;
    storing the first page table entry and the first secure state information in a first data cache line included in a first translation lookaside buffer associated with a first client, wherein a system-on-chip includes a plurality of processing units and the first memory and the first parallel processing unit is included in the plurality of the processing units, wherein the first parallel processing unit further comprises an internal memory, wherein the first secure state information originates from the internal memory of the first parallel processing unit and specifies at least one client authorized to access the first physical memory address, and
    generating a first memory access response based on the first page table entry and the first secure state information.

12. The method of claim 11, wherein the first request is received from the first client, and generating the first memory access response comprises determining that the first client is authorized to access data stored at a location specified by the first physical memory address based on the first secure state information.

13. The method of claim 12, wherein generating the first memory access response further comprises transmitting a response to the first client, wherein the response includes the first physical memory address.

14. The method of claim 12, wherein the first secure state information indicates that the first physical memory address specifies a location that is not included in the protected regions of memory.

15. The method of claim 11, wherein the first request is received from the first client, and generating the first memory access response comprises determining that the first client is not authorized to access data stored at a location specified by the first physical memory address based on the first secure state information.

16. The method of claim 11, wherein generating the first memory access response comprises:
  determining whether the first request is authorized to access data stored at a location specified by the first physical memory address based on the first secure state information; and
  if the first request is authorized, then producing a response that indicates a success state; or
  if the first request is not authorized, then producing a response that indicates a failure state.

17. The method of claim 11, further comprising:
  receiving a second request to translate a second virtual memory address to a second physical memory address;
  selecting, based on the second virtual memory address, a second data cache line included in the first translation lookaside buffer that includes a second page table entry and second secure state information; and
  generating a second memory access response based on the second page table entry and the second secure state information.

18. The method of claim 11, wherein determining the first secure state information comprises:
  determining a first page included in the protected regions of memory based on the first physical memory address; and
  retrieving secure state information that is associated with the first page.

19. The system of claim 1, wherein the first secure state information originates from the internal memory that is not accessible by an operating system of the system.

20. The system of claim 1, wherein the first secure state information originates from the internal memory that is not accessible by a software application that issues one or more commands to control the first parallel processing unit.

21. The system of claim 1, wherein the memory management unit determines the first secure state information without use of the first memory.

22. The system of claim 1, wherein the first memory is external to the first parallel processing unit.

23. The system of claim 1, wherein the plurality of processing units comprises the first parallel processing unit and a central processing unit.

24. The system of claim 1, wherein the plurality of processing units comprises the first parallel processing unit and a second parallel processing unit.

* * * * *